UNITED STATES PATENT OFFICE.

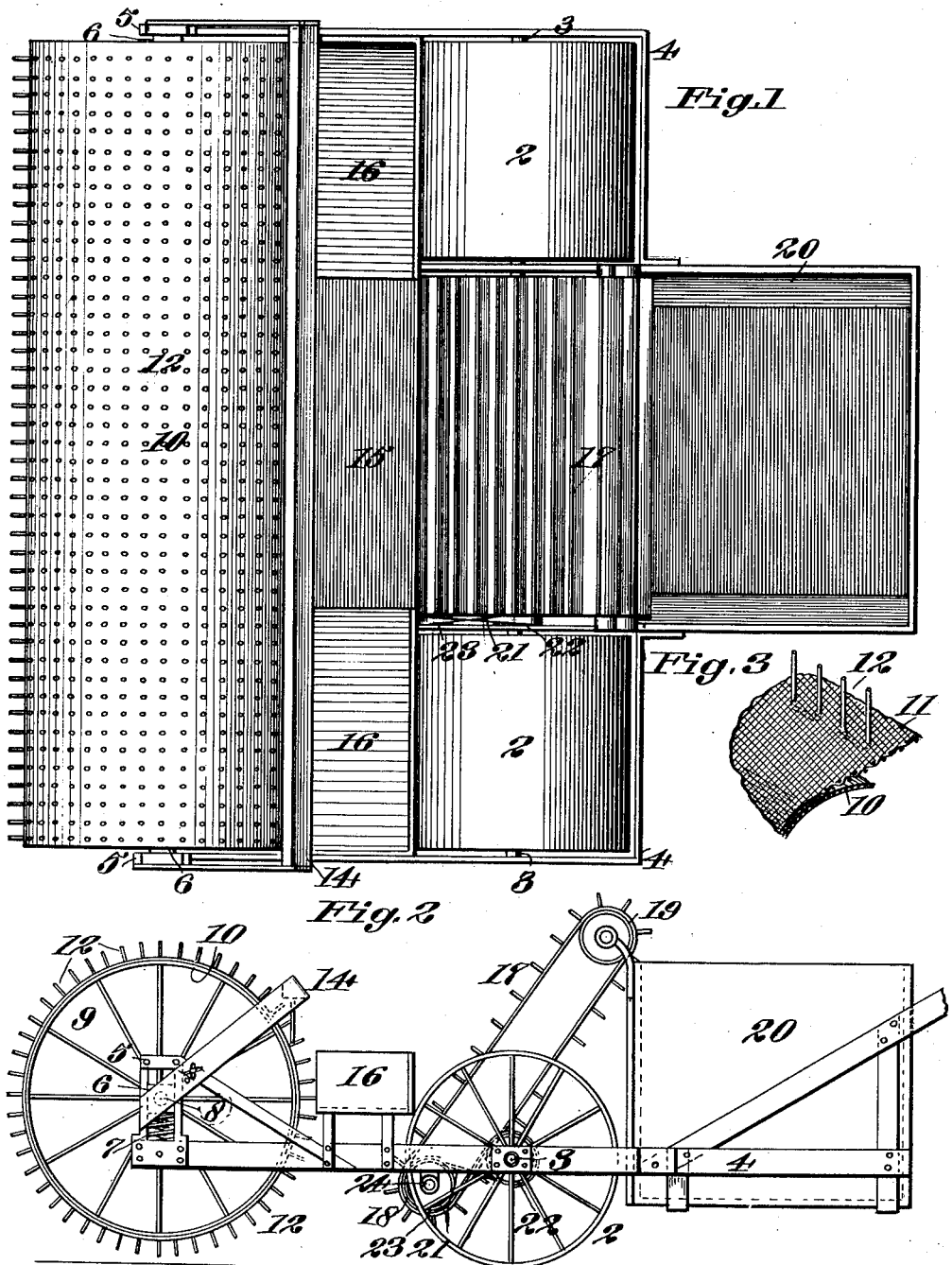

ARTHUR L. MORTON, OF MOUNTAIN VIEW, CALIFORNIA.

PRUNE-PICKER.

1,059,063.　　　　Specification of Letters Patent.　　Patented Apr. 15, 1913.

Application filed April 30, 1912. Serial No. 694,093.

*To all whom it may concern:*

Be it known that I, ARTHUR L. MORTON, a citizen of the United States, residing at Mountain View, in the county of Santa Clara and State of California, have invented new and useful Improvements in Prune-Pickers, of which the following is a specification.

This invention relates to a machine for picking fruit from the ground or other surface upon which it may rest, and collecting the fruit with as little handling as possible to avoid injury thereto.

The object of the present invention is to provide an apparatus involving a rotary picking drum mounted upon a frame; the weight of the picking member being practically counterbalanced by a collecting or retaining basket or drum projecting oppositely from a set of tractors adapted to travel over the ground or surface. A further object is to provide yieldable means for supporting the picking drum, so that the desired degree of pressure may be employed with which to pick up the fruit being gathered.

The invention consists of the parts and the construction and combination of parts as hereinafter more fully described and claimed, having reference to the accompanying drawings, in which—

Figure 1 is a plan view of the apparatus. Fig. 2 is a side elevation of the same. Fig. 3 is a perspective view of a portion of the drum or spacing sheathing and the pickers.

The present invention is evolved and devised with the object in view of constructing an apparatus which will operate to pick up fruit, such as prunes, resting upon the ground or other surface; the apparatus being so devised that the picking element is supported on a frame so that the picker drum can be sustained above the ground a desired distance. The vehicle is provided with running wheels on which a frame is mounted, and from which rearwardly projects a handle whereby the operator, by a slight pressure, can lift or depress the rotary picker during the operation of gathering fruit.

In its illustrated embodiment the invention comprises tractors or ground wheels 2, mounted on a shaft 3 extending transversely across an appropriate frame 4; the latter projecting forwardly of the tractors 2 and has bearing guides 5, in which are slidable journal blocks 6. The journal blocks 6 are yieldably supported upon respective springs 7, mounted on the forward ends of the frame 4.

In the journal blocks is mounted a shaft 8, to which are secured the heads 9 of a drum or picking member 10, which may be of sheet metal or other suitable material, and over which is led a perforated or other foraminous sheathing 11, through the perforations of which there is arranged to project radially a series of U-shaped pickers 12, Fig. 3. Preferably the prongs of the pickers 12 project sufficiently beyond their supporting screen or sheathing 11 to effectually enter the fruit to be gathered; the pickers being made of some substantial material, such as spring wire. The cross part of the U-shaped pickers is placed against the continuous drum 10 as a bearing surface, while the spacing of the prongs or pickers 12 is determined by the screen work or support 11.

As the apparatus is propelled over a surface by suitable force, an operator tilts the lower front portion of the frame 4 downwardly until the projecting picking prongs 12 enter the fruit, and these adhering to the prongs will be carried upwardly by the drum until engaging a scraping device 14 extending transversely across the extremities of the pickers 12; the picking off device 14 being effective to force the prunes off of the ends of the pickers 12 when they will fall onto an apron or shelf 15 arranged in the rear of the drum 10, the outer extremities or portions 16 of which are inclined downwardly toward the center of the apparatus, so that the prunes or other fruit being collected will roll from the apron 15 onto an endless conveyer 17, traveling around lower drums 18, appropriately mounted on the frame 4. The upper end of the conveyer belt 17 travels around an upper drum 19, and as the conveyer belt 17 traverses the upper drum, the fruit carried up by the conveyer will be precipitated into a basket or other carrier 20, of appropriate size, which has the function not only of carrying the collected fruit until a sufficient quantity has been gathered, but also has the function of acting as a partial counterbalance for the picking drum 10, so that the operator can more readily and easily control the elevation of the picker drum and thus the space beneath the lower ends of the pickers 12 during the operation of the apparatus.

The lower end of the conveyer 17 projects sufficiently forward beneath the apron or basin 15 to bring the conveyer 17 with such relation to the latter that during the movement of the conveyer the fruit will be successively collected from this and carried upwardly.

Power may be imparted to operate the belt 17 by any suitable or convenient form of gearing or mechanism, as for instance by the belt 21, passing around a suitable driving pulley 22 on a tractor 2; the belt also traversing a pulley 23 secured on the shaft 24 on which the lower drum 18 is secured.

Manifestly any suitable form of mechanism may be employed for transmitting power from the tractors 2 to drive the conveyer 17.

From the foregoing it will be seen that the present apparatus comprises a machine operable with the least injury, to collect fruit from a surface; the apparatus being designed for large capacity, and because of the counter-balancing of the gathering drum 10 by a basket or box 20, a better control of the drum is obtained so that the operator can lower or raise the picker points 12, as desired, when the apparatus is traversing a field or other surface.

Having thus described my invention, what I claim and desire to secure by Letters Patent is—

1. In a fruit gathering apparatus having a rotary drum and a supporting frame, a foraminous sheathing encircling the circumference of the drum and having points which project through the foraminations of the sheathing.

2. A fruit gathering apparatus, comprising a frame, ground wheel journaled approximately in the center of the frame, a drum mounted on one end of the frame, said drum having a foraminous sheathing fitted around its circumference and provided with points which extend through the openings in the sheathing, and a receptacle at the other end of the frame substantially counterbalancing the weight of the drum, said frame having spring supported journal boxes and said drum having a shaft mounted in said boxes.

3. The combination in a fruit gathering apparatus, of a suitable frame, ground wheels for the frame, a rotary drum at one end of the frame having a circumferential sheathing provided with projecting points, said points projecting through the openings in the sheathing and having their inner ends seating against the drum, said drum adapted to be raised and lowered by the frame, resilient bearings in which the drum is mounted, a receiving box at the opposite end of the frame, means for stripping from the points the fruit carried thereby, and an endless conveyer between the drum and the receiving box for conveying the fruit to the latter.

In testimony whereof I have hereunto set my hand in the presence of two subscribing witnesses.

ARTHUR L. MORTON.

Witnesses:
  PHIL W. CLARK,
  J. W. LOVEJOY.